United States Patent [19]

Shiokama et al.

[11] Patent Number: 5,797,048
[45] Date of Patent: Aug. 18, 1998

[54] AUTOMATIC FOCUSING DEVICE WHICH INHIBITS TRACKING DRIVE CONTROL WITH A ZOOM LENS HAVING FOCUS SHIFT

[75] Inventors: Yoshiharu Shiokama, Chiba-ken; Seiichi Yasukawa, Yotsukaido, both of Japan

[73] Assignee: Nikon Corporation, Tokyo, Japan

[21] Appl. No.: 872,143

[22] Filed: Jun. 10, 1997

[30] Foreign Application Priority Data

Jun. 14, 1996 [JP] Japan .................... 8-176010

[51] Int. Cl.⁶ .................................................. G03B 13/36
[52] U.S. Cl. .................................................. 396/80; 396/95
[58] Field of Search .................................. 396/79–82, 95, 396/103

[56] References Cited

U.S. PATENT DOCUMENTS 4,783,677 11/1988 Hamada et al. ................ 396/95

*Primary Examiner*—W. B. Perkey

[57] ABSTRACT

An automatic focusing device for a camera capable of accommodating an interchangeable zoom lens which prevents inadvertently performing a moving subject tracking lens drive control when the zoom lens causes focus shift as a result of a zooming operation. The automatic focusing device operates in a first drive mode in which movement of the subject in the optical axis direction is detected and the moving subject is tracked by providing compensation for the drive amount of the lens according to the movement of the subject, and a second drive mode in which movement of the subject in the optical axis direction is not detected and compensation for the drive amount of the lens is not provided. A determination that the zoom lens causes focus shift during a zooming operation is made when the object distance is within a specified distance range, and a focus shift signal is output when focus shift will occur. An inhibition device inhibits the lens drive in the first lens drive mode in response to the focus shift signal.

16 Claims, 6 Drawing Sheets

AUTOMATIC FOCUSING DEVICE WHICH INHIBITS TRACKING DRIVE CONTROL WITH A ZOOM LENS HAVING FOCUS SHIFT

CROSS REFERENCE TO RELATED APPLICATIONS

This application is based upon and claims priority from Japanese Patent Application No. 8-176010 filed Jun. 14, 1996, the contents of which are incorporated herein by reference. This application also claims the benefit of the provisional application filed Feb. 20, 1997 entitled AUTO FOCUS DEVICE AND DETACHABLE ZOOMING LENS having a Serial No. 60/037,952.

BACKGROUND OF THE INVENTION

1. Field of the Invention

The present invention relates to a camera having an automatic focusing device and interchangeable zoom lens, and, more particularly, the present invention relates to an automatic focusing camera including moving body tracking control which does not inadvertently perform tracking control when using a zoom lens having focusing capability.

2. Description of the Related Art

Cameras are known which provide the capability of performing automatic focusing on a moving subject by repeatedly performing a focus detection operation on the subject as it moves. More particularly, the known cameras which provide automatic focusing on a moving subject provide drive control for the focusing lens, referred to as tracking drive control or moving body forecast drive control, by detecting the movement of the subject in the optical axis direction based on changes in a focus detection condition (i.e., changes in the location of the image forming plane) and a driving condition of the focusing lens. The known tracking drive control or moving body forecast drive control systems provide drive control so that an in-focus condition is continuously achieved with respect to a subject that moves in the optical axis direction. For example, Japanese Laid-Open Patent Publication No. S63-148218 discloses the principle of operation of a known tracking drive control or moving body forecast drive control system.

Optical systems used in an automatic focusing camera include a zoom lens which may be a single focus lens or a lens having a variable focal length. The zooming action of the zoom lens normally does not cause a focus shift. Specifically, the zooming action of the zoom lens does not normally cause the location of the image forming plane to move in the optical axis direction as a result of the zooming action. However, due to restrictions of recent optical system design, such as size reduction of the optical system and increased magnification capability for the zooming rate, zoom lenses that cause focus shift as a result of the zooming action have been marketed. If the focus shift occurs in the entire photographic range, the lens is called a varifocal lens and may be distinguished from a zoom lens.

A problem arises in cameras having tracking drive control or moving body forecast drive control when used with a zoom lens that causes focus shift during zooming action. Specifically, since the automatic focusing device having the tracking drive control feature performs tracking determination by detecting the movement of the location of the image forming plane, a problem occurs in that the movement of the image forming plane resulting from the zooming action may be mistaken for the movement of the image forming plane due to the movement of the subject. Furthermore, even when a still subject is being photographed, the tracking drive control mode is activated by performing the zooming action, thereby excessively compensating for the amount of lens drive generated by the tracking mode. As a result, problems occur, such as an out of focus photograph or a focus operation requiring a longer time than normally required. Accordingly, an automatic focusing device is needed which does not inadvertently perform tracking drive control when using a zoom lens that causes focus shift during zooming action.

SUMMARY OF THE INVENTION

It is an object of the present invention to provide an automatic focusing device that does not inadvertently provide tracking drive control when using a zoom lens that causes focus shift due to zooming action.

Additional objects and advantages of the invention will be set forth in part in the description which follows, and, in part, will be obvious from the description, or may be learned by practice of the invention.

Objects and advantages of the present invention are achieved in accordance with a first embodiment of the present invention with an automatic focusing device for automatically focusing a photographic lens having a zooming function, the automatic focusing device having a first lens drive mode in which movement of an object in an optical axis direction is detected and the driving of the lens is compensated according to the detected movement of the object, and having a second lens drive mode in which movement of the object is not detected and driving of the lens is not compensated, the automatic focusing device comprising a determination device to determine whether a focus shift occurs as a result of a zooming operation of the photographic lens and to output a signal indicating that focus shift occurs due to the zooming operation, and an inhibition device to receive the signal indicating that focus shift occurs and to inhibit lens drive in the first drive mode in response to the focus shift signal.

In accordance with the first embodiment of the present invention, the automatic focusing device further comprises a zooming detection device to detect a zooming operation according to changes in a focal length of the photographic lens, and the inhibition device inhibits the lens drive in the first lens drive mode when the zooming detection device detects a zooming operation and the determination device outputs a focus shift signal. Further, the determination device determines that focus shift occurs when the object distance is within a specified distance range. Furthermore, the inhibition device disregards the focus shift signal if the focus shift signal is output during the lens drive in the first lens drive mode and inhibits lens drive in the first lens drive mode if the focus shift signal is output during lens drive in the second lens drive mode.

Objects and advantages of the present invention are achieved in accordance with a second embodiment of the present invention with an interchangeable lens mounted on an automatic focusing camera and having a zooming function, the interchangeable lens having a first lens drive mode in which movement of a subject in an optical axis direction is detected and the lens drive is compensated corresponding to the movement of the subject, and a second lens drive mode in which movement of the subject is not detected and the lens drive is not compensated, the interchangeable lens comprising a determination device to determine whether a focus shift occurs as a result of a zooming operation of the interchangeable lens, and to output a focus shift signal indicating that focus shift occurs due to the zooming operation, and an inhibition device to inhibit the lens drive in the first drive mode in response to the focus shift signal.

Objects and advantages of the present invention are achieved in accordance with a a third embodiment of the present invention with an automatic focusing device comprising a photographic lens having a variable focal length, the photographic lens including a first object distance range where the focal point of the photographic lens changes as the focal length changes, a defocus amount detection device to detect an amount of defocus of the photographic lens with respect to a subject, a drive amount calculation device to calculate a drive amount for the photographic lens based on the detected defocus amount, a moving subject determination device to determine whether the subject is moving in an optical axis direction based on the detected defocus amount, a control unit to control driving of the photographic lens in a first drive mode when it is determined that the subject is moving in the optical axis direction and to compensate the drive amount according to the detected movement, and to control driving of the photographic lens in a second drive mode which does not compensate the drive amount when it is determined that the subject is not moving in the optical axis direction, a detection device to detect whether the object distance is within the first range, and an inhibition device to inhibit the first lens drive mode when the detection device detects the object distances within the first range.

In accordance with the third embodiment of the present invention, the inhibition device inhibits the first lens drive mode while the focal length of the photographic lens is changing and when it is detected by the detection device that the object distance is within the first range. The automatic focusing device in accordance with the third embodiment further comprises a determination device to determine whether the focal point of the photographic lens changes as the focal length of the photographic lens changes, and to output a focus shift signal indicating that the focal point changes as the focal length changes, wherein the inhibition device inhibits lens drive in the first drive mode when the focus shift signal is output. The interchangeable lens may be a zoom lens and the automatic focusing device may further comprise a zooming operation determination device to determine whether the photographic lens is in a zooming operation, and the inhibition device inhibits the lens drive in the first drive mode while the photographic lens is in a zooming operation and the focus shift signal is output.

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
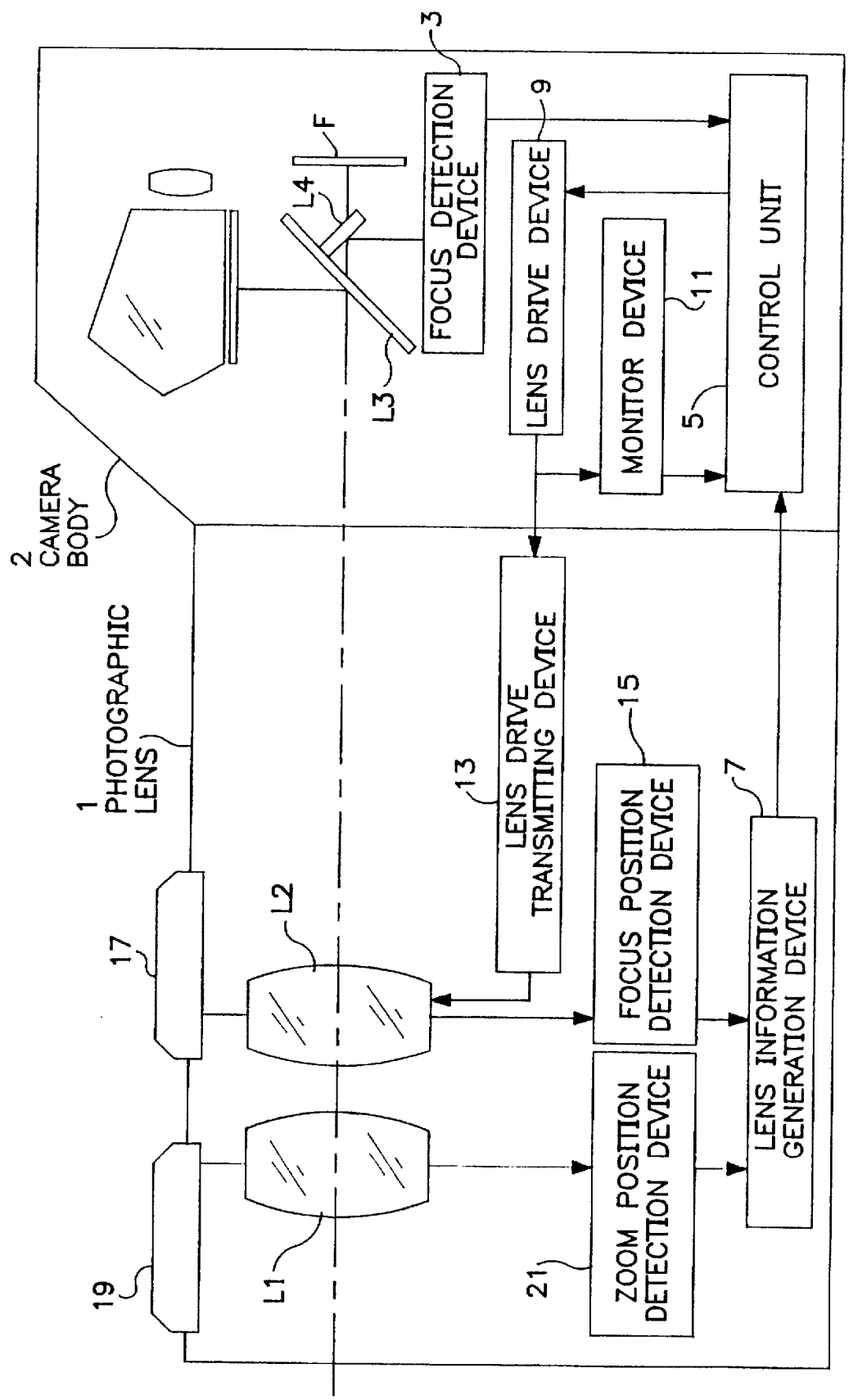
FIG. 1 is a block diagram of a camera having an automatic focusing device in accordance with embodiments of the present invention.

Reference will now be made in detail to the preferred embodiments of the present invention, examples of which are illustrated in the accompanying drawings wherein like reference numerals refer to the same or similar elements throughout.

FIG. 1 is a block diagram of a camera having an automatic focusing device and an interchangeable lens in accordance with embodiments of the present invention. The camera includes an interchangeable lens 1 mounted on a camera body 2. Light entering the interchangeable lens 1 is first transmitted through a photographic optical system L1–L2, comprising a zooming lens group L1 and a focusing lens group L2. The light from the photographic optical system L1–L2 is then transmitted through a half mirror L3 within the camera body 2, and is finally led to a focus detection device 3 via a sub-mirror L4. The light from the photographic optical system L1–L2 also forms an image on a film surface F at the time of photographic action. The focus detection device 3 determines a defocus amount, that is, an amount of discrepancy between the location of the actual image and the anticipated image forming plane, which is sent to a control unit 5.

The position of the focusing lens group L2 is detected as an absolute position by a focus position detection device 15, and this position is transmitted to a lens information generation device 7. The position of the zooming lens group L1 is detected as an absolute position by a zoom position detection device 21, and this position is transmitted to the lens information generation device 7. The control unit 5 converts the defocus amount determined by the focus detection device 3 into a drive amount to control a lens drive device 9 using the information transmitted from the lens information generation device 7. At this time, the position of the focusing lens group L2 is controlled by providing feedback of the drive amount to the control unit 5 via a monitor device 11. The driving force of the lens drive device 9 is transmitted to a lens drive transmitting device 13 within the interchangeable photographic lens 1 via a connecting member (not shown) in a mounting section, thereby providing the focusing drive of focusing lens group L2.

Further, manual focusing of the focusing lens group L2 can be performed by operating a distance maneuvering ring 17 which moves the focusing lens group L2. A zooming operation can be performed by manipulating a zooming operation ring 19 which causes the zooming lens group L1 to move to enable zooming action.

A tracking drive control operation will now be explained with reference to FIG. 3 which illustrates an instance of intermittent drive in which the lens drive is stopped to perform the defocus detection. When defocus detection is performed during the lens drive, higher in-focus accuracy can be achieved by performing velocity control that matches the locus of the movement of the subject. As shown in FIG.

3, the movement of the lens and subject are represented on the ordinate, while the time elapsed is represented on the abscissa. A straight line 81 represents the movement of a subject which is moving with constant velocity. Locus 83 represents the movement of the focusing lens group L2, starting at position 83a.

During normal drive, a defocus amount is detected at a lens stop position, and lens drive is activated corresponding to the detected defocus amount. More specifically, when the lens is stopped at position 83a, the first drive amount corresponds to the defocus amount 87, and, when the lens is stopped at position 89, the second drive amount corresponds to the defocus amount 89. Henceforth, as these actions are repeated, the lens is driven along the locus represented by solid line 83b and broken line 83c. Under the conditions shown in FIG. 3, as the subject continues to move with each drive of the focusing lens, the focusing lens does not reach the in-focus point.

When a tracking drive control mode is activated, a determination of whether the subject is a moving subject is first made. If the focusing lens does not reach the in-focus point after several attempts to drive the lens to the focused state within the range of the first solid line 83b, it is determined that the subject is moving, and the lens is driven along the locus of the solid line 85 thereafter. In other words, if it is determined that the subject moves during the lens drive, the focusing lens is driven by as much as drive amount 93 to compensate for the deficiency in drive amount with respect to the initial drive amount 91 in order to increase the drive amount to take into account the continuous subject movement during the lens drive.

Figure 2:
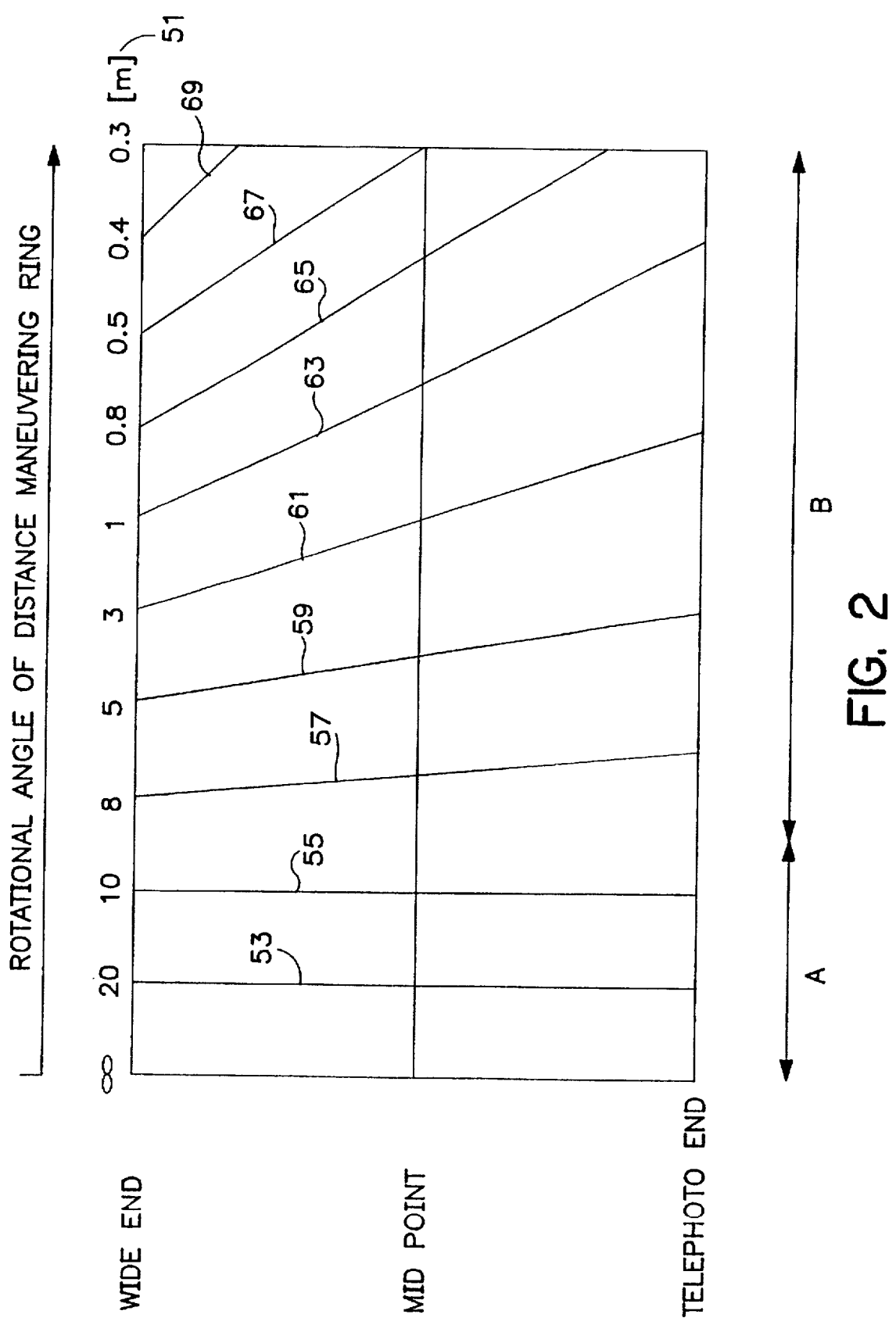
FIG. 2 is a chart showing an example of operating characteristics of the automatic focusing device in accordance with embodiments of the present invention.

A zoom lens with focus shift will now be described below with reference to FIG. 2, which is a chart showing an example of operating characteristics of a zoom lens having focus shift in accordance with embodiments of the present invention. As shown in FIG. 2, the change in focal length is indicated on the ordinate. The change in focal length of the zoom lens corresponds to a value set by either the zooming operation ring 19 or a value set by the zoom position detection device 21. The change in distance of a subject is indicated on the abscissa. The change in distance of the subject corresponds to either the rotational angle of the distance maneuvering ring 17 or the position detected by the focus position detection device 15. The scale 51 at the top of the chart indicates the object distance in meters on the wide end. Locuses 53–69 represent the rotational angle of the distance maneuvering ring 17 at each focal length corresponding to the same object distance, and show the focus shift caused by zooming.

Area A on the abscissa represents a range where there is no focus shift caused by zooming. For example, the position of the focal point does not vary by zooming at object distances of 20 m and 10 m. Area B represents a range where a focal shift occurs. For example, at the position of the distance maneuvering ring 17 that can be focused at 3 m with the wide end, the subject at the distance of 3 m cannot be focused at the mid-point and the telephoto end. However, at the same position of the distance maneuvering ring 17, it is possible to focus at 5 m with the telephoto end. In other words, if the zooming action is performed after focusing the subject at 3 m with the wide end, the image forming plane moves from the film surface. This condition is similar to that in which the subject has moved, as shown in FIG. 3.

Figure 3:
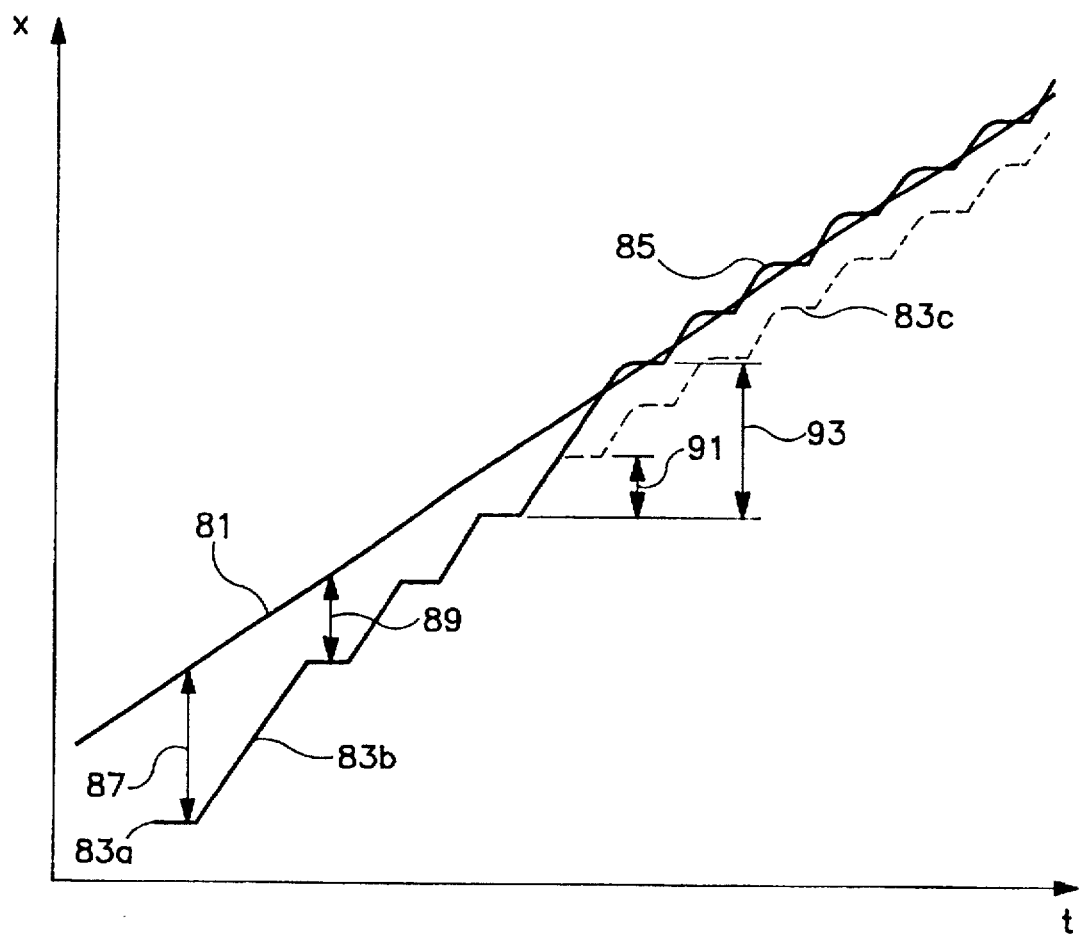
FIG. 3 is a graph showing an example of the operation of a zoom lens having focus shift usable with the camera having the automatic focusing device in accordance with embodiments of the present invention.

Consequently, if zooming is performed while viewing a still subject, the control unit 5 mistakenly identifies that the subject is moving, thereby resulting in a tracking mode drive control with excessive compensation, as illustrated by the locus 85 in FIG. 3. If zooming is stopped in this condition, the lead drive overruns since the subject is motionless, causing the in-focus point to be passed. As a result, it becomes difficult to focus, or the focusing time is prolonged by as much time as required for the lens to return to the in-focus point, resulting in inconvenience for the photographer.

Figure 4:
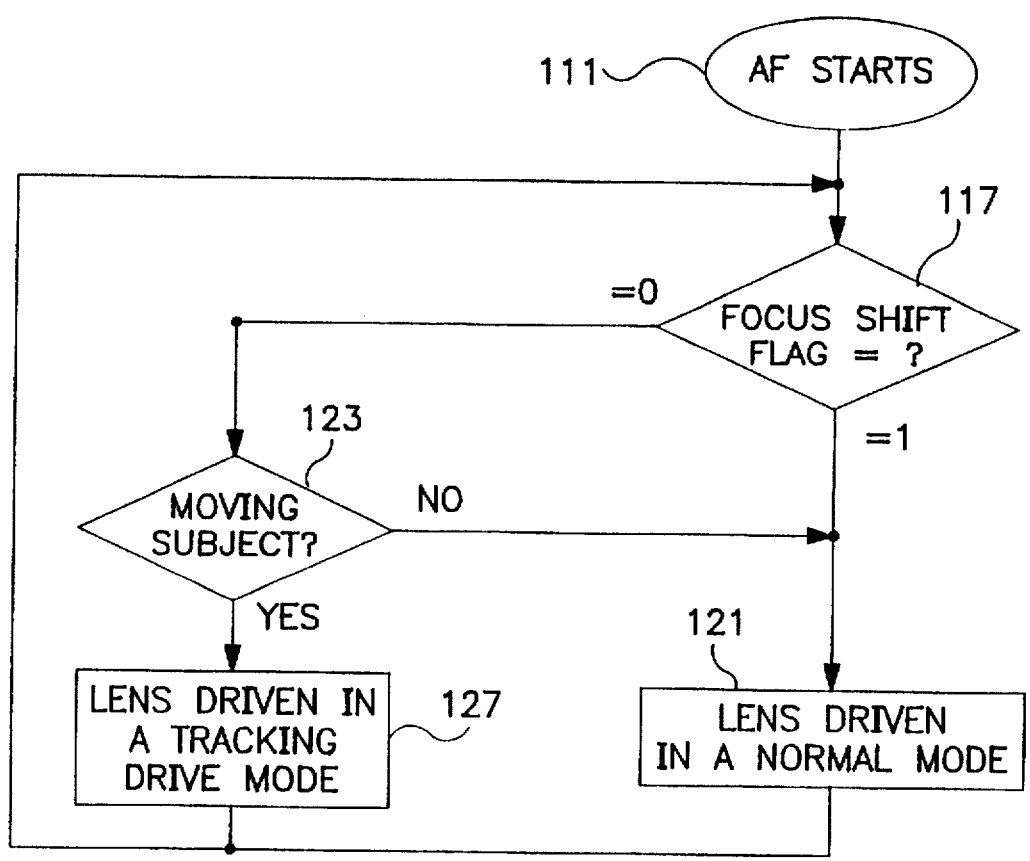
FIG. 4 is a flowchart illustrating an operational process for performing automatic focusing with an automatic focusing device and interchangeable zoom lens in accordance with a first embodiment of the present invention.
Figure 5:
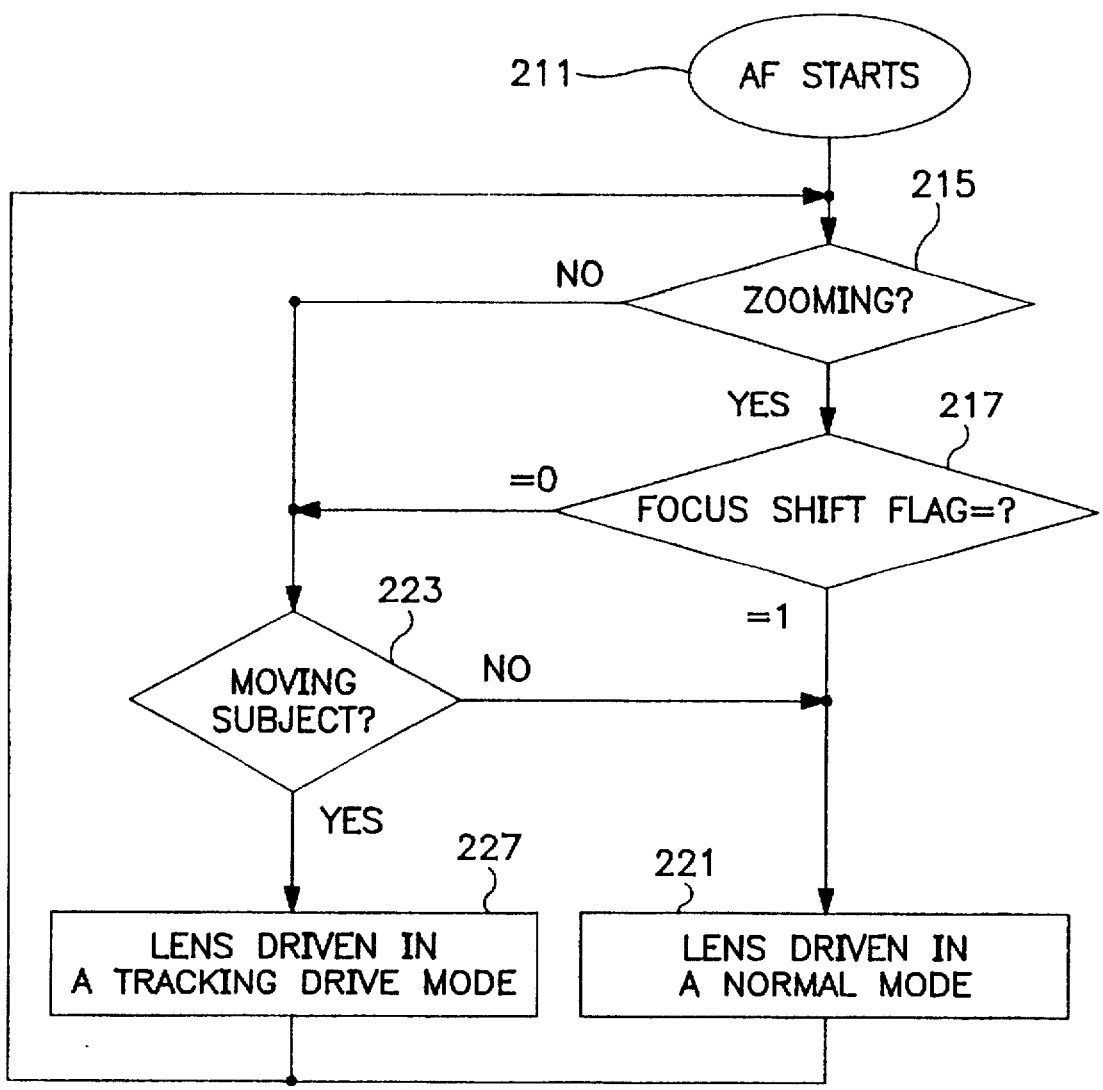
FIG. 5 is a flowchart illustrating an operational process for performing automatic focusing with an automatic focusing device and interchangeable zoom lens in accordance with a second embodiment of the present invention.
Figure 6:
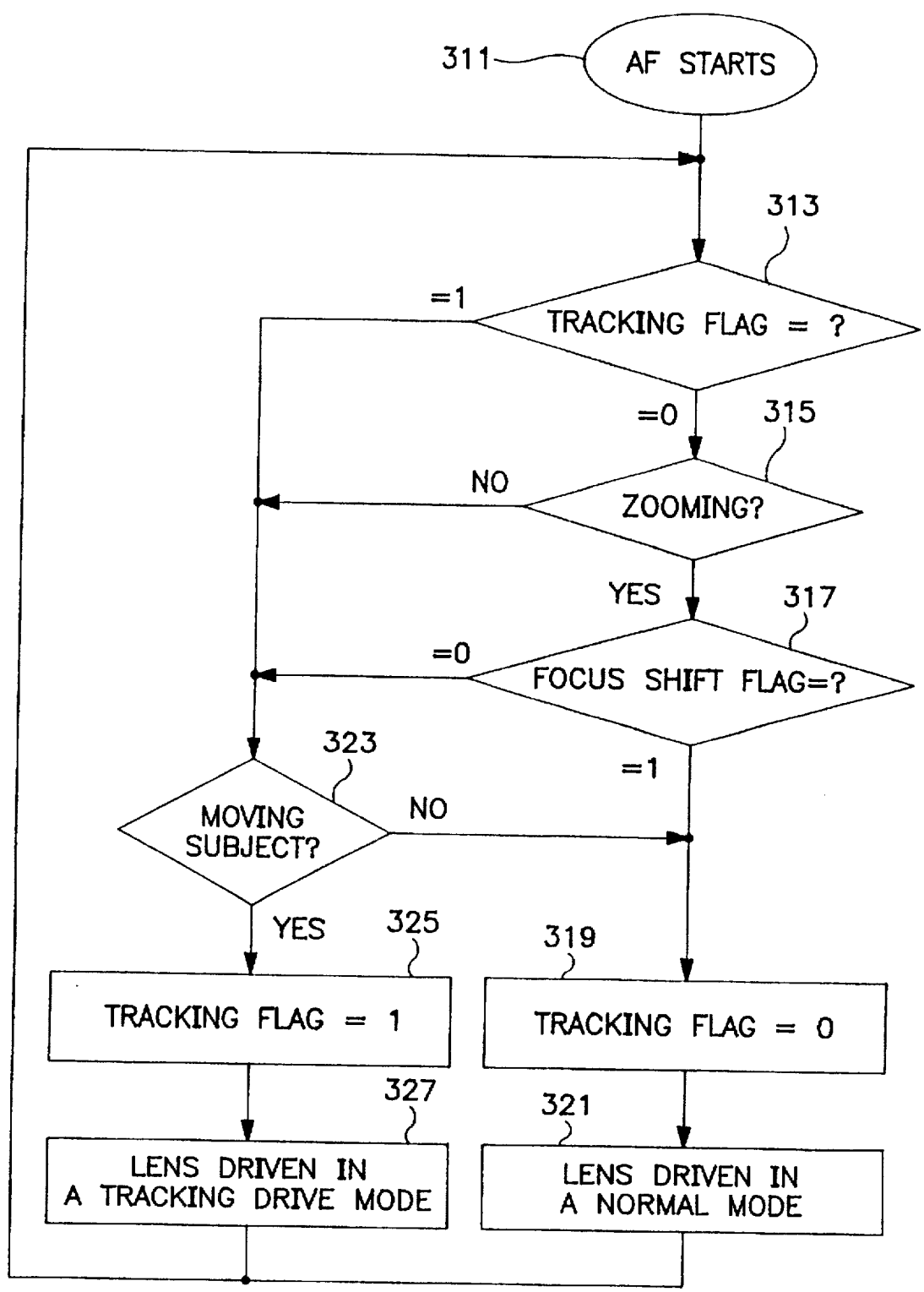
FIG. 6 is a flowchart illustrating an operational process for performing automatic focusing with an automatic focusing device and interchangeable zoom lens in accordance with a third embodiment of the present invention.

In order to avoid the above-described problems, in accordance with embodiments of the present invention, the operational processes shown in the flowcharts in FIGS. 4–6 are performed to prevent the automatic focusing device from inadvertently providing tracking control when using a zoom lens that causes focus shift due to zooming action.

FIG. 4 is a flowchart illustrating an operational process for performing automatic focusing in accordance with a first embodiment of the present invention. As shown in FIG. 4, an autofocus (AF) operation begins at step 111. Next, in step 117, it is determined whether a focus shift flag that is obtained from the focusing lens L2 is one (1) or zero (0). The state of the focus shift flag is established after the lens information generation device 7 determines whether or not the focusing lens group L2 is located in the area B shown in FIG. 2 using position information received from the focus position detection device 15. The lens information generation device 7 transmits a value one (1) to the control unit 5 indicating the presence of focus shift if the focusing lens group is located in area B, and transmits a value zero (0) to the control unit 5, indicating the absence of focus shift if the focusing lens group L2 is located in area A.

If the determination in step 117 is that the focus shift flag is one (1), a focus shift occurs as a result of the zooming action, and the lens drive is performed in a normal mode at step 121. However, if the result of step 117 is zero (0), a focus shift does not occur as a result of the zooming action, and the operational process proceeds to step 123 where it is determined whether or not the subject is a moving subject. If the subject is determined to be a moving subject, lens drive is performed in the tracking drive mode at step 127, while lens drive is performed in a normal mode at step 121 if the subject is determined to be a non-moving subject. The process shown in FIG. 4 is repeated at each defocus detection.

FIG. 5 is a flowchart illustrating an operational process for performing automatic focusing in accordance with a second embodiment of the present invention. It is noted that steps 217, 221, 223 and 227 in FIG. 5 correspond to steps 117, 121, 123 and 127, respectively, in FIG. 4, and a detailed description of these corresponding steps will not be repeated hereinbelow.

In accordance with the second embodiment of the invention, the AF operation begins in step 211, and next, in step 215, it is determined whether or not a zooming operation is in progress. A determination of whether a zooming operation is in progress is made based on focal length information from the zoom position detection device 21 received by the lens information generation device 7 and transmitted to the camera body control unit 5. If the control unit 5 determines that there are changes in focal length since the previous focal length information determination, it is determined that a zooming operation is in progress.

If it is determined in step 215 that the zooming operation is not in progress, the operational process proceeds to step 223 where determination of a moving subject is performed. More specifically, if a zooming operation is not in progress, the image forming plane does not move even in the area where focus shift occurs. If a zooming operation is in progress, the focus shift flag is verified at step 217, which is the same as step 117. The remaining steps 221, 223 and 227 are identical with those described with respect to the first embodiment, and a description of these steps is not repeated here.

FIG. 6 is a flowchart illustrating an operational process for performing automatic focusing in accordance with a third embodiment of the present invention. Steps 315, 317, 321, 323 and 327 in FIG. 6 correspond to steps 215, 217, 221, 223 and 227 in FIG. 5, respectively, and a detailed description of these corresponding steps will not be repeated hereinbelow. In accordance with the third embodiment of the present invention, a tracking mode determination operation is included in the operational process.

As shown in FIG. 6, the autofocus operation begins in step 311, and, in step 313, it is determined whether a tracking mode is set according to the state of a tracking flag. The tracking flag is set to a value of one (1) while the tracking lens drive mode is activated, and to a value zero (0) when the normal lens drive mode is activated. If the tracking flag is one (1), the automatic focusing device is already in the tracking mode, and the operational process proceeds to step 323, where a determination of a moving subject is performed. More specifically, if the tracking mode is activated, it is very likely that the subject is continuously moving, even if the lens is located in the area where focus shift occurs due to a zooming operation. Therefore, if the automatic focusing device is already in the tracking mode, the determination of a moving subject may be performed without determining whether or not the zooming operation is in progress or whether the focus shift flag is set. If it is determined that the tracking flag is zero (0) in step 313, the operational process proceeds to step 315 where it is determined whether a zooming operation is in progress. If a zooming operation is in progress, in step 317, it is determined whether the focus shift flag is one (1) or zero (0).

The operational processes performed in steps 315, 317, 321, 323, and 327 are identical with those performed in steps 215, 217, 221, 223 and 227 of the second embodiment, and are not repeated here. However, if the focus shift flag is one (1) in step 317, the tracking flag is set to zero (0) in step 319, and the lens is driven in a normal mode. If the focus shift flag is zero (0) in step 317, and it is determined that the subject is a moving subject in step 323, the tracking flag is set to one (1) at step 325, and the lens is driven in a tracking drive mode. The state of the tracking flag set in steps 319 and 325 can be determined at step 313 in a following operational process.

In accordance with embodiments of the present invention, a determination as to whether or not a zooming operation is in progress is performed by devices within the camera body which detect the changes in focal length information sent from an interchangeable lens. However, the present invention is not limited to making a zooming determination with devices located in the camera body, and it is also possible to determine whether the zooming operation is performed by devices within the interchangeable lens, and to send the information indicating that zooming is in progress from the interchangeable lens to the camera body.

Moreover, in accordance with embodiments of the present invention, the focus shift information is transmitted to the camera body from the interchangeable lens system. However, the present invention is not limited in this manner, and it is also possible to use similar signals within a camera body when using an optical system where the focus shift may occur due to a zooming operation in a lens integration type camera.

As described above, in accordance with embodiments of the present invention, the automatic focusing device and interchangeable zoom lens makes it possible to avoid inadvertently entering a tracking mode when a zooming operation is performed which causes focus shift to occur due to the zooming. By detecting the zooming operation with a zooming detection device which detects that the set focal length of the photographic lens has changed, it is possible to perform focusing in a tracking lens drive control mode without zooming in the area where focus shift occurs. Furthermore, in the area where focus shift does not occur, determination of the moving subject is appropriately performed in a tracking mode for the subject that actually moves in the optical axis direction.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. An automatic focusing device for automatically focusing a photographic lens having a zooming function, the automatic focusing device having a first lens drive mode in which movement of an object in an optical axis direction is detected and driving of the lens is compensated according to the detected movement and a second lens drive mode in which movement of the object is not detected and driving of the lens is not compensated, comprising:

a determination device to determine whether a focus shift occurs as a result of a zooming operation of the photographic lens and to output a signal indicating that focus shift occurs due to the zooming operation; and an inhibition device to receive the signal indicating that focus shift occurs and to inhibit lens drive in the first drive mode in response to the focus shift signal.

2. An automatic focusing device as recited in claim 1, wherein the determination device determines that focus shift occurs when the object distance is within a specified distance range.

3. An automatic focusing device as recited in claim 1, further comprising:

a zooming detection device to detect a zooming operation according to changes in a focal length of the photographic lens, wherein the inhibition device inhibits the lens drive in the first lens drive mode when the zooming detection device detects a zooming operation and the determination device outputs a focus shift signal.

4. An automatic focusing device as recited in claim 1, wherein the inhibition device disregards the focus shift signal if the focus shift signal is output during the lens drive in the first lens drive mode and inhibits lens drive in the first lens drive mode if the focus shift signal is output during lens drive in the second lens drive mode.

5. An interchangeable lens mountable on an automatic focusing camera and having a zooming function, the camera having a first lens drive mode in which movement of a subject in an optical axis direction is detected and the lens drive is compensated corresponding to the movement of the subject, and a second lens drive mode in which movement of the subject is not detected and the lens drive is not compensated, comprising:

a device to generate and output focus shift signals to the automatic focusing camera indicating that a focus shift will occur as a result of the zooming operation of the interchangeable lens.

6. An interchangeable lens as recited in claim 5, wherein the device outputs focus shift signals indicating that focus shift will occur as a result of the zooming operation when the lens is within a specified range, and the first lens drive mode is inhibited when the focus shift occurs.

7. An automatic focusing device, comprising:
   a photographic lens having a variable focal length, the photographic lens including a first object distance range where the focal point of the photographic lens changes as the focal length changes;
   a defocus amount detection device to detect an amount of defocus of photographic lens with respect to a subject;
   a drive amount calculation device to calculate a drive amount for the photographic lens based on the detected defocus amount;
   a moving subject determination device to determine whether the subject is moving in an optical axis direction based on the detected defocus amount;
   a control unit to control driving of the photographic lens in a first drive mode when it is determined that the subject is moving in the optical axis direction and to compensate the drive amount according to the detected movement, and to control driving of the photographic lens in a second drive mode which does not compensate the drive amount when it is determined that the subject is not moving in the optical axis direction;
   a detection device to detect whether the object distance is within the first range; and
   an inhibition device to inhibit the first lens drive mode when the detection device detects the object distance is within the first range.

8. An automatic focusing device as recited in claim 7, wherein the inhibition device inhibits the first lens drive mode while the focal length of the photographic lens is changing and when it is detected by the detection device that the object distance is within the first range.

9. An automatic focusing device as recited in claim 7, further comprising:
   a determination device to determine whether the focal point of the photographic lens changes as the focal length of the photographic lens changes, and to output a focus shift signal indicating that the focal point changes as the focal length changes,
   wherein the inhibition device inhibits lens drive in the first drive mode when the focus shift signal is output.

10. An automatic focusing device as recited in claim 9, wherein the photographic lens is a zoom lens and the automatic focusing device further comprises a zooming operation determination device to determine whether the photographic lens is in a zooming operation, and the inhibition device inhibits the lens drive in the first drive mode while the photographic lens is in a zooming operation and the focus shift signal is output.

11. An automatic focusing device as recited in claim 10, wherein the inhibition device determines whether the lens is being driven in the first drive mode and determines whether the photographic lens is in a zooming operation, and determines whether or not the focus shift signal is being output,
   and the drive in the first drive mode is inhibited when the first drive mode is not activated, the photographic lens is in the zooming operation and the focus shift signal is being output.

12. An automatic focusing device for a photographic lens system having a zooming function, comprising:
   a moving object tracking control device to continuously focus the photographic lens on a subject moving in an optical axis direction;
   a determination device to determine whether a focus shift occurs as a result of a zooming operation of the photographic lens and to output a signal indicating that focus shift occurs; and
   an inhibition device to inhibit operation of the moving body tracking control device in response to the focus shift signal.

13. An automatic focusing device as recited in claim 12, wherein the photographic lens system includes a focusing lens group and the determination device comprises:
   a focus position detection device to detect a position of the focusing lens group;
   a control unit to determine a subject distance based on the position detected by the focus position detection device, and to compare the subject distance with a specified distance range; and
   an output device to output the focus shift signal when the control unit determines that the subject distance is within the specified range.

14. An automatic focusing device as recited in claim 12, further comprising:
   a zooming detection device to detect a zooming operation of the photographic lens,
   wherein the inhibition device inhibits the moving subject tracking control device when the zooming detection device detects a zooming operation and the determination device outputs a focus shift signal.

15. An automatic focusing device as recited in claim 12, wherein the inhibition device does not inhibit the moving subject tracking control device if the focus shift signal is output during operation of the moving body tracking control device to focus on a subject.

16. An automatic focusing device as recited in claim 14, wherein the photographic lens system includes a zooming lens group and the zooming detection device comprises:
   a zoom position detection device to detect a position of the zooming lens group; and
   a control unit to determine a change of focal length of the zooming lens group based on the position of the zooming lens group.

* * * * *